United States Patent
Marlin et al.

(10) Patent No.: US 9,212,097 B2
(45) Date of Patent: Dec. 15, 2015

(54) MOLTEN GRAINS OF ALUMINA-ZIRCONIA

(75) Inventors: Samuel Marlin, Plan d'Orgon (FR); David Langohr, Conflans Sainte Honorine (FR); Sylvain Petigny, Velleron (FR)

(73) Assignee: SAINT-GOBAIN CENTRE DE RECHERCHES ET D' ETUDES EUROPEEN, Courbevoie (FR)

( * ) Notice: Subject to any disclaimer, the term of this patent is extended or adjusted under 35 U.S.C. 154(b) by 44 days.

(21) Appl. No.: 13/389,011

(22) PCT Filed: Aug. 4, 2010

(86) PCT No.: PCT/IB2010/053528
§ 371 (c)(1),
(2), (4) Date: Mar. 30, 2012

(87) PCT Pub. No.: WO2011/015995
PCT Pub. Date: Feb. 10, 2011

(65) Prior Publication Data
US 2012/0186161 A1    Jul. 26, 2012

(30) Foreign Application Priority Data
Aug. 5, 2009 (FR) .................... 09 55513

(51) Int. Cl.
| B24D 3/00 | (2006.01) |
| B24D 3/02 | (2006.01) |
| B24D 11/00 | (2006.01) |
| B24D 18/00 | (2006.01) |
| C09K 3/14 | (2006.01) |
| C04B 35/109 | (2006.01) |

(52) U.S. Cl.
CPC ............. *C04B 35/109* (2013.01); *C09K 3/1436* (2013.01); *C04B 2235/3201* (2013.01); *C04B 2235/3206* (2013.01); *C04B 2235/3208* (2013.01); *C04B 2235/3225* (2013.01); *C04B 2235/3232* (2013.01); *C04B 2235/3418* (2013.01); *C04B 2235/72* (2013.01); *C04B 2235/762* (2013.01)

(58) Field of Classification Search
USPC .......................................... 51/308, 293, 307
See application file for complete search history.

(56) References Cited

U.S. PATENT DOCUMENTS

| 3,181,939 A | * | 5/1965 | Marshall | ............... C04B 35/484 51/309 |
| 4,457,767 A | * | 7/1984 | Poon et al. | ............ C04B 35/109 501/105 |
| 5,525,135 A | * | 6/1996 | Moltgen et al. | ....... C09K 3/1409 451/28 |
| 2004/0040218 A1 | * | 3/2004 | Aleonard et al. | ..... C04B 35/109 51/309 |
| 2013/0067828 A1 | * | 3/2013 | Knuth | ................... C04B 35/013 51/309 |

FOREIGN PATENT DOCUMENTS

| DE | 4306966 C1 | 1/1994 |
| JP | 59 227726 A | 12/1984 |
| JP | 59227726 A | 12/1984 |

OTHER PUBLICATIONS

International Search Report for PCT/IB2010/053528, dated Jan. 28, 2011.

* cited by examiner

*Primary Examiner* — James McDonough
(74) *Attorney, Agent, or Firm* — Cooper Legal Group, LLC

(57) ABSTRACT

The invention relates to a fused grit having the following chemical analysis, in wt %: $ZrO_2+HfO_2$: 38.0-46.0%; $Al_2O_3$: the remainder up to 100%; $SiO_2$: 0.20-0.60%; $Y_2O_3$: 0.45 to 0.70%; $TiO_2$: 1.00 to 2.00%; other oxides: <1.00%, the ratio of $Y_2O_3/SiO_2$ being 0.80 to 2.00, and the tetragonal phase being 60 to 90% of the weight of the zirconia, the remainder being in monoclinic form.

12 Claims, No Drawings

MOLTEN GRAINS OF ALUMINA-ZIRCONIA

TECHNICAL FIELD

The present invention relates to fused ceramic grits, especially for applications as abrasive grits. The invention also relates to a mixture of said grits and to an abrasive tool comprising a grit mixture according to the invention.

PRIOR ART

Abrasive tools are generally classified according to the method of forming the constituent ceramic grits thereof: free abrasives (used by spraying or in suspension, with no backing), coated abrasives (with a fabric or paper backing, in which the grits are arranged over several layers) and bonded abrasives (in the form of circular grinding wheels, sticks, etc.). In the latter case, the abrasive grits are pressed with an organic or glassy binder (in this case, a binder consisting of oxides, essentially a silicate binder). These grits must themselves have good mechanical abrasion properties (especially toughness) and provide good mechanical cohesion with the binder (interfacial strength). At present, there are various families of abrasive grits enabling a wide range of applications and performance to be covered: oxide grits synthesized by melting offer in particular an excellent quality/manufacturing cost compromise.

The alumina-based abrasive grits conventionally used in the manufacture of grinding wheels or abrasive belts combine three principal categories depending on the type of application and abrasion regime encountered: fused grits based on alumina; fused grits based on alumina-zirconia and grits based on alumina obtained by the sol-gel process.

Within the range of fused grits, materials based on alumina and zirconia are known from U.S. Pat. No. 3,181,939. These grits are generally composed of 10 to 60% zirconia, 0 to 10% of an additive, the balance being alumina. Known additives include yttrium oxide, added up to 2% according to U.S. Pat. No. 4,457,767, or titanium oxide added up to 10% according to the patent DE-C1-4306966. These additives improve the abrasive power of the alumina-zirconia grits. U.S. Pat. No. 5,525,135 also discloses fused grits based on alumina-zirconia-titanium oxide.

Finally, JP 59227726 discloses fused grits of alumina-zirconia-titanium oxide-yttrium oxide, the yttrium oxide possibly being added in an amount of between 0.05% and 7%, preferably between 1 and 5%, based on the sum of alumina, zirconia and titanium.

In the case of machining hard steel, the alumina-based fused grits have a low toughness, which results in excessive spalling of the grit. The fused grits based on alumina-zirconia have a very high toughness combined with a lower hardness. They make it possible to machine hard steels efficiently, but tend to develop flats. In general, this results in an increase in the forces applied on the abraded part, and depending on the operating conditions, this part may ever be thermally damaged. The alumina-based grits obtained by the sol-gel process constitute a good compromise. This is because they have a high hardness, an intermediate toughness, enabling them to regenerate their cutting edges, and a fine microstructure resulting in microfracturing of the grit, ensuring a long lifetime on hard steels.

To machine ductile steels of low hardness, such as stainless steels, the fused grits based on alumina-zirconia are effective. This is because their high toughness limits their fracturing. The alumina-based grits obtained by the sol-gel process are in general less effective than fused grits based on alumina-zirconia, because of their lower toughness. Fused grits based on alumina are the least effective, since they have a low toughness that results in excessive spalling.

It is usual to measure and compare the abrasive performance of various grits with respect to the mass of steel machined divided by the mass of abrasive grits consumed during said machining, called here the ratio S. Although this ratio does give an order of magnitude of the abrasive performance of grits, it does not however take into account all the mechanisms involved during machining. For example, a rapidly consumed grit, owing to rapid wear, having substantial removal of material, may lead to a high ratio S. However, this grit may not be sufficiently enduring for machining a large number of parts. It may also lead to excessive thermal damage of the machined parts, caused by bluing of the parts resulting from excessive developed cutting power, but this power is necessary in order to maintain the cutting regime.

There is therefore a need for a mixture of fused alumina-zirconia abrasive grits having a high ratio S for machining with a low developed power while having a long lifetime or endurance. The objective of the invention is to meet this need.

SUMMARY OF THE INVENTION

According to the invention, this objective is achieved by means of a fused grit having the following chemical composition, in percentages by weight:
$ZrO_2+HfO_2$: 38.0 to 46.0%
$Al_2O_3$: balance to 100%
$SiO_2$: 0.20 to 0.60%
$Y_2O_3$: 0.45 to 0.70%;
$TiO_2$: 1.00 to 2.00%
other elements, expressed in oxide form: <1.00%,
the $Y_2O_3/SiO_2$ ratio being between 0.80 and 2.00, and the tetragonal phase representing between 60 and 90% of the mass of zirconia, the remainder being in the monoclinic form.

As will be seen in greater detail in the rest of the description, the inventors have discovered that, with the chemical composition above, and in particular within a very narrow range of yttrium oxide contents, a limited proportion of tetragonal zirconia is advantageous. This teaching is moreover contrary to that of U.S. Pat. No. 5,525,135 or JP 59227726 which suggest, or even recommend, a maximum proportion of tetragonal zirconia in order to increase the efficiency of machining.

A grit according to the invention may also have one or more of the following optional features:
preferably, the $Y_2O_3/SiO_2$ mass ratio is greater than 1.00, preferably greater than 1.10, and/or less than 1.80, preferably less than 1.50, preferably less than 1.40 and more preferably less than 1.30;
preferably, the tetragonal zirconia represents more than 70% and/or less than 85% of the mass of zirconia;
preferably, the $ZrO_2$ content is greater than 40%;
preferably, the silica content is greater than 0.3%, preferably greater than 0.35%;
the mass content of titanium oxide $TiO_2$ is greater than 1.30% and/or less than 1.70%;
preferably, the other elements expressed in oxide form are less than 0.50%, in particular:
MgO: <0.30%, preferably <0.10%, preferably <0.05%, and/or
CaO: <0.30%, preferably <0.20%, preferably <0.10%, and/or
$Na_2O$: <0.10%, preferably <0.05%; and
the other elements expressed in oxide form are impurities.

The invention also relates to a grit mixture comprising, in percentages by weight, more than 80%, preferably more than 90%, preferably more than 95%, preferably more than 99% and preferably substantially 100% of abrasive grit particles according to the invention. Preferably, the grit mixture according to the invention meets the particle size distribution in accordance with those of mixtures or grits measured according to the following standards: FEPA Standard 42-GB-1984, R1993 and FEPA Standard 43-GB-1984 and R1993.

The invention also relates to an abrasive tool, especially in the form of a grinding wheel or an abrasive belt, comprising a mixture of abrasive grits bound together by a binder or deposited as a layer on a backing, especially a flexible backing, and retained by a binder, this tool being noteworthy in that the grits are in accordance with the invention.

In general, the invention relates to the use of grits according to the invention for abrading.

Definitions

The oxide contents of a grit according to the invention relate to the overall contents for each of the corresponding chemical elements, expressed in the form of the most stable oxide, according to the usual convention in the industry; therefore included are suboxides and optionally nitrides, oxynitrides, carbides, oxycarbides, carbonitrides or even metallic species of the abovementioned elements;

the term "impurities" is understood to mean the inevitable constituents, necessarily introduced with the raw materials. In particular, the compounds forming part of the group of oxides, nitrides, oxynitrides, carbides, oxycarbides, carbonitrides and metallic species of sodium and other alkali metals, iron, vanadium and chromium are impurities. To give an example, CaO, MgO or $Na_2O$ may be mentioned. The residual carbon forms part of the impurities of the composition of the products according to the invention. However, hafnium oxide is not considered as an impurity;

the term "precursor" of an oxide is understood to mean a constituent capable of providing said oxide during manufacture of a grit or of a grit mixture according to the invention;

in a product obtained by fusion, $HfO_2$ is not chemically separable from $ZrO_2$. In the chemical composition of such a product, $ZrO_2+HfO_2$ therefore denotes the total content of these two oxides. However, according to the present invention, $HfO_2$ is not intentionally added in the feedstock. $HfO_2$ therefore denotes only traces of hafnium oxide, this oxide always being naturally present in zirconia sources at contents generally below 2%. For the sake of clarity, there may therefore be no distinction between expressing the content of zirconia and traces of hafnium oxide with $ZrO_2+HfO_2$ or by $ZrO_2$ or else by "zirconia content";

the term "fused grit" or more generally "fused product", is understood to mean a solid grit (or product) obtained by solidification upon cooling a molten material;

a "molten material" is a liquid mass that may contain a few solid particles, but in an insufficient amount for them to be able to structure said mass. To maintain its shape, a molten material must be contained in a container;

in the present description, unless mentioned otherwise, all the compositions of a grit are given in percentages by weight on the basis of the total mass of oxides of the grit.

The fused grits according to the invention may be manufactured by any conventional process for manufacturing alumina-zirconia grits. One conventional process customarily comprises the following steps: mixing of the raw materials; melting in an electric arc furnace; solidification by quenching the molten liquid; milling and optionally classification according to the particle size required.

The properties of the mixtures of fused alumina-zirconia grits are dependent on the thermal history of the molten liquid, which itself depends on the process parameters but also strongly on the geometry of the furnace and its environment (collection of the flue gas, materials, etc.). The process parameters are therefore determined according to the furnace employed, the raw materials used, etc., so as to obtain a grit mixture according to the invention at the end of these steps. The parameters may for example take the values for the process used in the examples below.

EXAMPLES

The following nonlimiting examples are given for the purpose of illustrating the invention.

The products given as examples were produced from the following raw materials:

alumina powder sold under the name AR75 by Alcan, having a soda content of less than 0.4%;

zirconia powder having an average content of zirconia +hafnium of greater than 85%, containing 5% silica on average, an alumina content of less than 10% and a content of other elements of less than 0.7%;

yttrium oxide powder sold under the name "Yttrium Oxide 99.99 LY" by Altichem, having a $Y_2O_3$ content of greater than 99.99% and having a median diameter between 3 and 6 microns;

"rutile sand" titanium powder sold by Europe Minerals, having a $TiO_2$ content greater than 95% and a median diameter of around 125 microns; and petroleum coke sold by Solutia Incorporated, having a size between 1 and 4 mm.

The grits were prepared using the following conventional process well known to those skilled in the art:

a') the raw materials, with an addition of at least 0.5% (up to 3%) of petroleum coke depending on the state of the furnace, are mixed;

b') the materials are melted in a single-phase electric arc furnace of the Heroult type having graphite electrodes, with a furnace tank of 0.8 m in diameter, a voltage of 105-150 V, a current of 1500 to 2500 A and a delivered specific electrical energy of 2.1 to 2.8 kWh per kg of charge, c') the molten material is suddenly cooled by means of a device for casting it between thin metal plates, such as the device shown in the patent U.S. Pat. No. 3,993,119, so as to obtain an entirely solid slab, constituting a solid mass, d') said solid mass cooled in step c') is milled so as to obtain a grit mixture; and e') the grits are selected by screening to be between 500 and 600 µm.

To evaluate the performance and the lifetime of the grit mixtures, grinding wheels 12.7 cm in diameter, containing 1 gram of grits of each example, were produced.

The surfaces of plates made of 304 stainless steel, measuring 20.3 cm×7.6 cm×5.1 cm, were then machined using these grinding wheels, with a reciprocating movement at a constant speed, while maintaining a constant cutting depth of 12.7 µm and a grinding wheel rotation speed of 3600 rpm. The maximum power $P_{max}$ drawn by the grinding wheel during machining was recorded.

After the grinding wheel had been completely worn away, the mass of machined steel (i.e. the mass of steel removed by the grinding operation) "Ma" and the mass of grinding wheel consumed "Mm" were measured, the ratio S being the ratio Ma/Mm.

The cutting efficiency was determined by measuring the maximum power P., drawn by the grinding wheel during the machine test and the lifetime $t_{max}$ of the grinding wheel, the lifetime of a grinding wheel being considered as reached when all the grits of the grinding wheel have been consumed.

Table 1 gives the chemical composition and the proportion of tetragonal zirconia of the various grit mixtures tested. Table 2 gives the results obtained with these mixtures.

The percentage improvement in the ratio S is calculated by the following formula: 100×(ratio S of the product of the relevant example−ratio S of the product of the reference example)/(ratio S of the product of the reference example), the reference example being comparative example 1* or comparative example 2*. A high positive value of the percentage improvement of the ratio S is desired.

The percentage reduction in the maximum power $P_{max}$ drawn by the grinding wheel during the test is calculated by the following formula: 100×($P_{max}$ with the product of the reference example−$P_{max}$ with the product of the relevant example)/($P_{max}$ of the product of the reference example), the reference example being comparative example 1* or comparative example 2*. A high positive value of the percentage reduction in the maximum power $P_{max}$ drawn by the grinding wheel during the test is desired.

The percentage improvement in the lifetime $t_{max}$ of the grinding wheel is calculated by the following formula: 100× ($t_{max}$ of the product of the relevant example−$t_{max}$ of the product of the reference example)/($t_{max}$ of the product of the reference example), the reference example being comparative example 1* or comparative example 2*. A high positive value of the percentage of improvement in the lifetime $t_{max}$ of the grinding wheel is desired.

The percentage tetragonal zirconia mass content in the zirconia is determined in the following manner: the grits to be tested are coated with a resin so as to constitute a pellet. An X-ray diffraction pattern is acquired using a Bruker D5000 diffractometer with a copper anticathode, on a polished section of the pellet containing more than 600 grits. The acquisition is carried out over a 2θ angular range between 25° and 37°, in steps of 0.02° and a time of 4 seconds per step. A 0 6 mm receiving slit is used, the specimen being rotated on itself so as to limit the effects of preferred orientations. The acquisition time is increased by a factor of 5 for better statistical counting.

The percentage monoclinic zirconia mass content is measured from the ratio of the areas of the (111) and (111) peaks of monoclinic zirconia to the (111) peak of stabilized zirconia according to the following formula, after deconvolution processing using the TOPAS P software, the deconvolution function being a pseudo-Voigt function:

$$\% \text{ monoclinic zirconia} = \frac{100 \times \rho_{Mono} \times 1.311 Area_{Mono}}{\rho_{Mono} \times 1.311 Area_{Mono} + \rho_{Stab} \times Area_{Stab}}$$

$\rho_{Mono}$ being the density of monoclinic zirconia, equal to 5.8 g/cm$^3$, and $\rho_{Stab}$ being the density of stabilized zirconia, equal to 6.1 g/cm$^3$.

The percentage stabilized zirconia mass content is given by the following formula:

$$\% \text{ stabilized zirconia} = 100 - \% \text{ monoclinic zirconia}$$

In the tested grits according to the invention, the stabilized zirconia is entirely in the tetragonal crystallographic form, the rest being zirconia in the monoclinic crystallographic form.

The percentage contents of tetragonal zirconia are expressed relative to the total crystallized zirconia.

Tables 1 and 2 below summarize the results obtained.

Comparative example 1* is a grit having a composition close to that of example 5 of JP 5922772 and comparative example 2* is a grit according to U.S. Pat. No. 4,457,767.

TABLE 1

| Example | $ZrO_2 + HfO_2$ (%) | $Al_2O_3$ (%) | $SiO_2$ (%) | $TiO_2$ (%) | $Y_2O_3$ (%) | $Na_2O$ (%) | MgO (%) | CaO (%) | Others (%) | $Y_2O_3/SiO_2$ | Tetragonal zirconia (%) |
|---|---|---|---|---|---|---|---|---|---|---|---|
| 1* | 42.7 | balance to 100% | 0.1 | 1.16 | 0.85 | <0.05 | <0.05 | 0.06 | 0.12 | 8.5 | 100 |
| 2* | 38.5 | balance to 100% | 0.30 | 0.12 | 0.80 | <0.05 | 0.08 | 0.07 | 0.07 | 2.66 | 87 |
| 3 | 40.6 | balance to 100% | 0.50 | 1.53 | 0.67 | <0.05 | <0.05 | 0.04 | 0.25 | 1.34 | 76 |
| 4 | 41.7 | balance to 100% | 0.39 | 1.54 | 0.57 | <0.05 | <0.05 | 0.05 | 0.23 | 1.46 | 85 |
| 5 | 42.5 | balance to 100% | 0.40 | 1.56 | 0.54 | <0.05 | <0.05 | 0.05 | 0.24 | 1.35 | 87 |
| 6 | 38.4 | balance to 100% | 0.57 | 1.49 | 0.57 | <0.05 | <0.05 | 0.06 | 0.28 | 1.00 | 74 |
| 7 | 42 | balance to 100% | 0.58 | 1.48 | 0.53 | <0.05 | <0.05 | 0.04 | 0.15 | 0.91 | 65 |
| 8 | 42.2 | balance to 100% | 0.58 | 1.51 | 0.57 | <0.05 | <0.05 | 0.06 | 0.20 | 0.98 | 67 |
| 9** | 37.7 | balance to 100% | 0.66 | 1.51 | 0.57 | <0.05 | <0.05 | 0.04 | 0.27 | 0.86 | 72 |
| 10** | 39.5 | balance to 100% | 0.18 | 1.11 | 0.43 | <0.05 | <0.05 | 0.05 | 0.24 | 2.39 | 91 |
| 11 | 38.1 | balance to 100% | 0.6 | 1.54 | 0.59 | <0.05 | <0.05 | 0.06 | 0.30 | 0.98 | 64 |
| 12** | 40.9 | balance to 100% | 0.53 | 0.71 | 0.4 | <0.05 | <0.05 | 0.05 | 0.25 | 0.75 | 57 |
| 13** | 42.6 | balance to 100% | 0.52 | 3.21 | 0.3 | <0.05 | <0.05 | 0.04 | 0.26 | 0.58 | 78 |
| 14** | 39.7 | balance to 100% | 0.53 | 0.68 | 0.42 | <0.05 | <0.05 | 0.05 | 0.1 | 0.79 | 55 |
| 15 | 41.3 | balance to 100% | 0.59 | 1.59 | 0.5 | <0.05 | <0.05 | 0.05 | 0.29 | 0.85 | 71 |
| 16 | 43.4 | balance to 100% | 0.44 | 1.62 | 0.53 | <0.05 | <0.05 | 0.04 | 0.26 | 1.20 | 79 |
| 17 | 45.3 | balance to 100% | 0.38 | 1.61 | 0.49 | <0.05 | <0.05 | 0.04 | 0.27 | 1.29 | 74 |

**examples outside the invention;
*comparative examples (outside the invention).

TABLE 2

| Example | Ratio S % improvement/ example 1* | Ratio S % improvement/ example 2* | $P_{max}$ % reduction/ example 1* | $P_{max}$ % reduction/ example 2* | $t_{max}$ % improvement/ example 1* | $t_{max}$ % improvement/ example 2* |
|---|---|---|---|---|---|---|
| 1* | — | — | — | — | — | — |
| 2* | — | — | — | — | — | — |
| 3 | 34 | 39 | 12 | 13 | 24 | 26 |
| 4 | 18 | 22 | 6 | 7 | 19 | 20 |
| 5 | 28 | 33 | 21 | 22 | 25 | 27 |
| 6 | 14 | 19 | 6 | 7 | 23 | 25 |
| 7 | 15 | 19 | 17 | 18 | 20 | 22 |
| 8 | 16 | 21 | 23 | 24 | 17 | 19 |
| 9** | 2 | 6 | 2 | 3 | 7 | 9 |
| 10** | 6 | 9 | 3 | 4 | 10 | 12 |
| 11 | 10 | 15 | 15 | 16 | 17 | 19 |
| 12** | −3 | 1 | −16 | −14 | −4 | −3 |
| 13** | 7 | 13 | 19 | 20 | 0 | 1 |
| 14** | 6 | 10 | −5 | −3 | 8 | 10 |
| 15 | 27 | 32 | 17 | 18 | 15 | 17 |
| 16 | 29 | 35 | 20 | 21 | 18 | 20 |
| 17 | 31 | 36 | 20 | 21 | 24 | 25 |

The inventors consider that there is a good compromise between the ratio S, the maximum power $P_{max}$ drawn by the grinding wheel during the machining test and the lifetime $t_{max}$ of the grinding wheel when:
 the ratio S is improved by at least 10% compared with the products of reference examples, and
 the maximum drawn power $P_{max}$ is reduced by at least 5% compared with the products of the reference examples, and
 the lifetime $t_{max}$ of the grinding wheel is improved by at least 6% compared with the products of the reference examples.

Preferably, the ratio S is improved by at least 15%, preferably at least 20%, preferably at least 25% or even at least 30% and/or the maximum drawn power $P_{max}$ is reduced by at least 10%, preferably at least 15% or even at least 20% and/or the lifetime $t_{max}$ of the grinding wheel is improved by at least 10%, preferably at least 15% or even at least 20%.

Example 10 shows that a tetragonal zirconia content of 91% of the mass of zirconia does not allow the desired comprise to be achieved.

Examples 12 and 14 show that a tetragonal zirconia content of 57% and 55% respectively of the zirconia mass is insufficient for achieving the desired compromise.

Example 11 shows that a tetragonal zirconia content of 64% of the mass of zirconia does allow said compromise to be achieved.

Example 9 shows that a silica content of 0.66% is too high and does not enable said compromise to be achieved. Example 10 shows that a silica content of less than 0.20% does not enable said compromise to be achieved.

Example 13 shows that despite suitable tetragonal zirconia and silica contents, the compromise is not achieved if the yttrium oxide content is less than 0.45% and if the $TiO_2$ content is greater than 2%.

Examples 10, 12 and 14 show that a $Y_2O_3/SiO_2$ ratio of less than 0.80 and greater than 2.00 does not enable the compromise to be achieved.

Of all the examples, example 17 is preferred.

As is now clearly apparent, the invention provides a mixture of fused alumina-zirconia abrasive grits of exceptional abrasive performance, exceptional endurance and exceptional cutting efficiency.

Of course, the present invention is not however limited to the embodiments described and shown, these being given as nonlimiting illustrative examples.

The invention claimed is:

1. A fused grit having the following chemical composition, in percentages by weight:
 $ZrO_2$ + $HfO_2$ : 38.0 to 46.0%
 $Al_2O_3$ : balance to 100%
 $SiO_2$ : 0.20 to 0.60%
 $Y_2O_3$ 0.45 to 0.70%
 $TiO_2$ : 1.00 to 2.00%
 other elements, expressed in oxide form: <1.00%,
 $Y_2O_3/SiO_2$ ratio being between 0.80 and 2.00, and
 a tetragonal phase representing between 60 and 90% of the mass of zirconia, the remainder being in the monoclinic form.

2. The grit as claimed in claim 1, in which the $Y_2O_3$ / $SiO_2$ mass ratio is greater than 1.00 and less than 1.80.

3. The grit as claimed in claim 1, in which the $ZrO_2$ content is greater than 40.0%.

4. The grit as claimed in claim 1, in which the silica content is greater than 0.35%.

5. The grit as claimed in claim 1, in which the $Y_2O_3$ / $SiO_2$ ratio is greater than 1.10 and less than 1.30.

6. The grit as claimed in claim 1, in which the mass content of titanium oxide $TiO_2$ is greater than 1.30% and less than 1.70%.

7. The grit as claimed in claim 1, in which the tetragonal zirconia represents more than 70% but less than 85% of the mass of zirconia.

8. The grit as claimed in claim 1, in which the other oxides are less than 0.50%.

9. The grit as claimed in claim 1, in which:
 MgO : <0.30%, and/or
 CaO : <0.30%, and/or
 $Na_2O$ : <0.10%.

10. The grit as claimed in claim 9, in which:
 MgO : <0.10%, and/or
 CaO : <0.20%, and/or
 $Na_2O$ : <0.05%.

11. An abrasive tool comprising grit mixture as claimed in claim 1, said grits being bound together by a binder or deposited as a layer on a flexible backing, and retained by a binder.

12. The tool as claimed in claim 11, in the form of a grinding wheel or an abrasive belt.

* * * * *

UNITED STATES PATENT AND TRADEMARK OFFICE
CERTIFICATE OF CORRECTION

PATENT NO. : 9,212,097 B2  
APPLICATION NO. : 13/389011  
DATED : December 15, 2015  
INVENTOR(S) : Samuel Marlin et al.

Page 1 of 1

It is certified that error appears in the above-identified patent and that said Letters Patent is hereby corrected as shown below:

IN THE SPECIFICATION

Please delete "P.," in column 5, line 5 and replace therefor with $-P_{max}-$

Signed and Sealed this  
Twelfth Day of April, 2016

Michelle K. Lee  
*Director of the United States Patent and Trademark Office*